United States Patent [19]
DeLuca

[11] 3,807,028
[45] Apr. 30, 1974

[54] INSERT MOUNTING TOOL AND METHOD OF USING SAME

[75] Inventor: Carlo Bruno DeLuca, Chesterfield, Mo.

[73] Assignee: International Telephone and Telegraph Corporation, New York, N.Y.

[22] Filed: Oct. 13, 1972

[21] Appl. No.: 297,471

[52] U.S. Cl.................. 29/426, 29/255, 29/281, 29/282
[51] Int. Cl............................................ B23p 19/00
[58] Field of Search............ 29/280, 281, 282, 255, 29/426

[56] References Cited
UNITED STATES PATENTS

| | | | |
|---|---|---|---|
| 3,055,093 | 9/1962 | Ruble | 29/282 |
| 3,479,722 | 11/1969 | Maness | 29/213 |
| 1,851,421 | 3/1932 | Conklin | 29/213 |
| 3,222,915 | 12/1965 | Swisher | 29/213 |
| 2,847,752 | 8/1958 | Simmons | 29/280 |
| 2,951,282 | 9/1960 | Albright | 29/281 |
| 3,137,064 | 6/1964 | Pearl et al. | 29/281 |
| 2,013,923 | 9/1935 | Naccarato | 29/281 |
| 714,989 | 12/1902 | Worthington | 29/213 |
| 3,120,700 | 2/1964 | Chuplis | 29/281 |
| 2,487,331 | 11/1949 | Greene | 29/281 |

Primary Examiner—Charles W. Lanham
Assistant Examiner—James R. Duzan
Attorney, Agent, or Firm—James B. Raden; Marvin M. Chaban

[57] ABSTRACT

Disclosed is a tool which is designed to grasp an internally threaded tubular insert and to either install or to withdraw the insert from an object having both a surrounding interference fit with the insert and having a threaded mating at the remote end of the tube insert. The tool comprises a tubular member with external threading along the axially slitted barrel of the member adjacent one end. The barrel mates with the internal threading of the insert to engage the insert. The engagement is further tightened by a member expanding the slitted barrel in the insert to allow the tool and insert to be either installed or withdrawn jointly. One section of the tubular member is formed with a suitable shape to allow the member to be readily grasped with a wrench or the like to effect the installation or removal.

9 Claims, 9 Drawing Figures

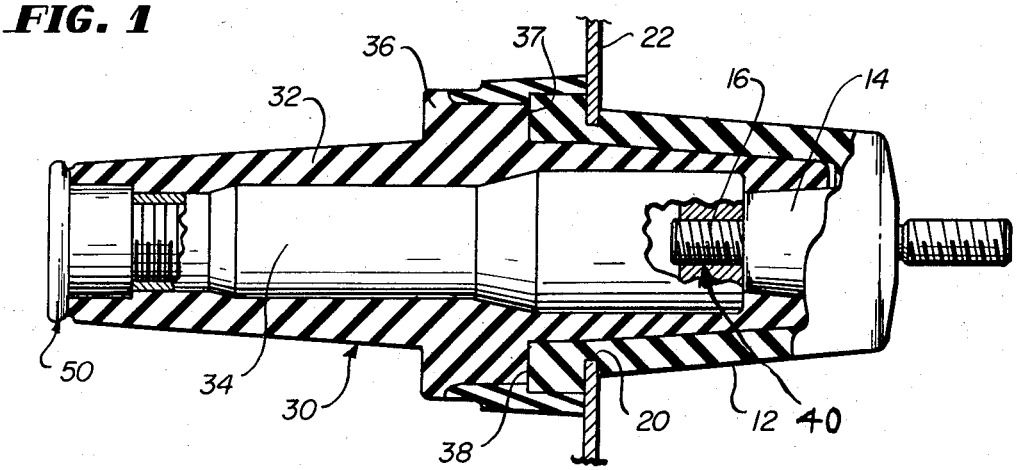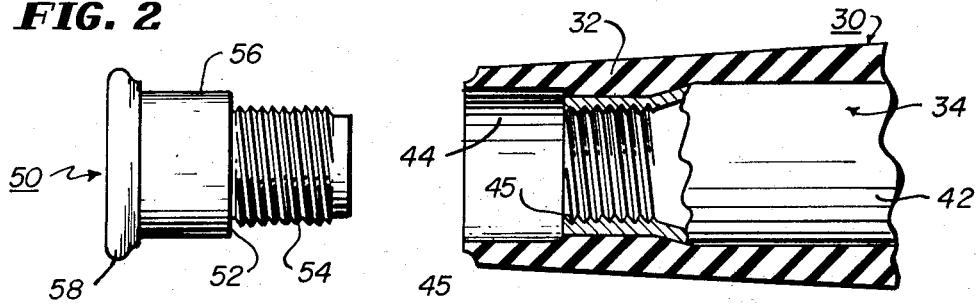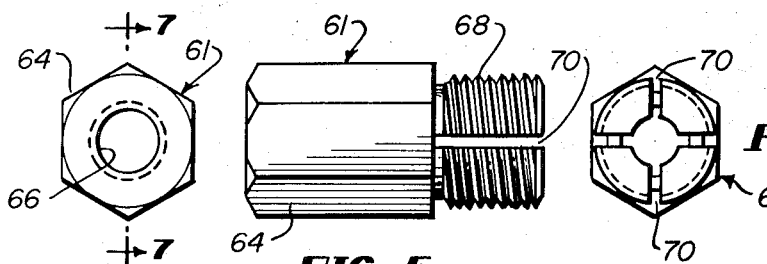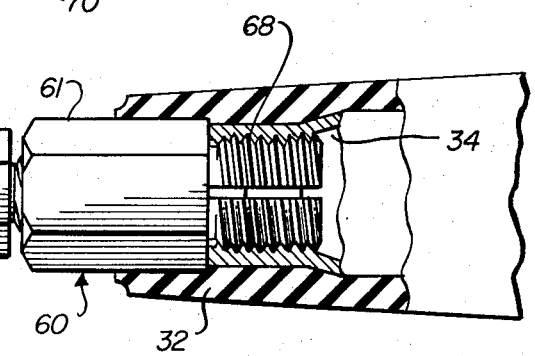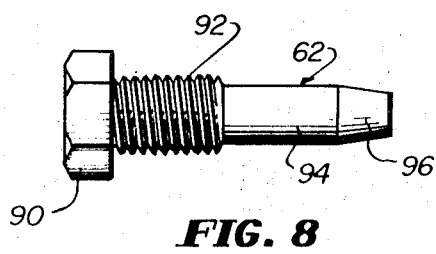

3,807,028

INSERT MOUNTING TOOL AND METHOD OF USING SAME

BACKGROUND OF THE INVENTION

In co-pending application Ser. No. 238,562, filed Mar. 27, 1972, in the names of Mr. G. Schurter and myself, we showed a high voltage, high current loadbreak bushing insert of the type to which my tool is applied. The bushing insert or plug in that application, however, was not shown mounted in the bushing well from which my tool is designed to either install or extract it.

In the known art, a bushing insert is mounted in a cup-shaped bushing well with connection of the inner conductive shell of the bushing insert screwed onto the threaded conductive stud extending outwardly of the base of the well. The insert has an elastomeric body which must fit tightly within the body of the well (usually epoxy) with a minimum of air pockets or voids along the mating surfaces to prevent corona development. The connection must be a tight one to permit current passage between the stud and insert shell at elevated currents and voltages. When a bushing insert has been connected in a well for a period of months or longer, or has been inadequately lubricated prior to insertion, the bushing insert tends to lock into the well, making it extremely difficult to detach and remove.

The usual practice is to grasp the body of the bushing with an external strap wrench and break the bushing insert-to-well engagement in that way. First, a strap wrench is large and unwieldy. Second, positive gripping is difficult, since the gripping surface of the insert being an elastomeric one, tends to absorb a portion of the applied energy, thus preventing a substantial portion of the applied torque from being used for the basic purpose of turning the bushing.

SUMMARY OF THE INVENTION

The invention provides a tool for use both in installing and removing a bushing insert from a load break bushing well and also covers the method of removing same. In the connection of a bushing insert into a bushing well, an arc snuffer tube is normally fitted into the threaded mouth of the bushing insert. By removing the snuffer from the internal threads of the bushing insert, the open mouth threaded section is exposed. The tool disclosed herein comprises a tubular collet member having an externally threaded axially slitted barrel. The barrel is screwed into the threaded mouth of the insert. A threaded stud having a tapered toe end is then screwed into threads in the bore of the collet member body. The tapered toe end of the stud spreads the split barrel tightly into the plug threads. The collet member may then be rotated in the removal direction to detach the bushing plug from the receiving well.

It is, therefore, an object of the invention to provide a new and improved tool for removing a load break bushing insert or plug from its receiving well without damaging either bushing or well.

It is a further object of the invention to provide an improved method for detaching a load break bushing from its receiving well.

It is an object of the invention to provide a tubular threaded collet member which may be inserted into a load break bushing plug and which may be tightened into the bushing plug and may be rotated in the reverse direction by imposing more than the tightening force on the collet member without detaching the collet member from the bushing plug.

It is a still further object of the invention to provide a tool with an externally threaded barrel for mating with a suitable internally threaded object and which allows the barrel to be tightened more fully into the object to allow the object and the tool to be detached as a unit.

It is a further object of the invention to provide a new and improved method for extracting a load break bushing from its receiving well.

The need for such a tool may be summarized as follows: When a bushing insert is threadedly mounted into its appropriate well, and remains installed for long periods of time (months or more) or when installed with inadequate insulation lubrication, extreme difficulty is encountered with removal.

My idea is to grip the metal lining of the insert with a two-piece tool, comprised of a collet and a collet expander. Torque can be transmitted to the expander by means of a wrench, to further tighten the collet in the insert. Thereafter, the collet can be turned in the release direction to back the insert off. The backing force can be applied in a reasonably accessible manner. Additionally, use of the tool should do little to no damage to the insert and to the tool.

One way of performing the extraction of the insert is to apply force to the metal shell of the insert using the threads provided in the insert shell for the "Arc Snuffer." With a threaded tool inserted into this portion of the insert tube, in place of the snuffer, and the threaded portion of the tool expanded to grip the metal insert threads more tightly, the insert may be more easily released and removed by applying torque to the tool.

These and other objects, features and advantages of the invention will become apparent from the following description taken in conjunction with the accompanying drawings, of which the following is a brief description.

BRIEF DESCRIPTION OF THE DRAWINGS

FIG. 1 is a sectional view of a load break bushing insert mounted into a bushing well and assembled with an "Arc Snuffer" tube, the assembly of FIG. 1 being known in the art;

FIG. 2 is a side view in elevation of the arc snuffer of FIG. 1, partially broken away as indicated;

FIG. 3 is a partial sectional view of a bushing insert aligned with the snuffer of FIG. 2;

FIG. 4 is an end view in elevation of a collet member according to my invention;

FIG. 5 is a side view in elevation of the collet member of FIG. 4;

FIG. 6 is a view in elevation of the opposite end of the collet member of FIG. 4;

FIG. 7 is a sectional view taken along line 7—7 of FIG. 4;

FIG. 8 is a side view in elevation of the expander bolt member of my invention; and FIG. 9 is a partial view of my tool inserted into the insert of FIG. 3 for operation of the tool.

DETAILED DESCRIPTION OF THE DRAWINGS

Turning now to the drawings, in FIG. 1, I show a fully assembled insert-receiving, cup-shaped bushing well 12 disposed about a bushing 14 with threaded stud 16 extending from the bushing. The bushing 14 is suitably connected to primary electrical distribution apparatus such as a transformer or switch gear, as is well-known in the art. The bushing well 12 may be suitably molded or otherwise formed of comparatively rigid insulating material such as an epoxy and is designed to mount within a flanged opening 20, the metal flange 22 otherwise rendering the connection of the well to the bushing waterproof. The connection of the well 12 to the flange 22, bushing 14 and stud 16 may, for all practical purposes, be considered a permanent one.

Mounted on stud 16 and within the bushing well, is a tubular bushing insert or plug 30 having a suitable outer shell 32 of elastomeric material tightly surrounding a conductive tubular shell 34 of copper or the like. The outer shell 32 is dimensioned to fit tightly (with an interference fit) within the well opening with the elongated wall surfaces of the two members in a large area interference fit, to provide a degree of contact necessary both for water-proofing purposes and to prevent large air voids within which corona may form. The bushing insert 30 has an outward peripheral raised area 36 designed to rest against and seal the joinder to the flange. The raised area has an annular recess 37 adapted to mate with and receive the peripheral exposed edge 38 of the bushing well to produce a waterproof joinder of the insert, well and flange.

The inner conductive shell 34 has a threaded opening 40 at one end for mating with the bushing stud 16 in a tight fit designed to pass current of high magnitudes and at elevated voltages across the screw threaded connection. The inner shell 34 is continuous and imperforate throughout its body portion 42 leading to the mouth end opening 44 which is internally threaded at a location recessed within the plug mouth opening.

In the normal usage, an arc snuffer tube 50 is threadedly mounted in the plug mouth opening 44, the snuffer tube having a shoulder 52 which enters the plug mouth to fit tightly therein and waterproof the mouth entry. The snuffer tube has an external thread 54 about one end section thereof to mate with the inner threaded mouth section 44 of the bushing plug. Tube 50 has a raised section 56 adjacent the threaded section and a cylindrical head 58 used to aid in gripping the snuffer tube. The snuffer tube 50 is made of any known insulating material which acts to snuff and extinguish a high voltage arc generated by withdrawal of a high voltage electrode from the snuffer tube bore. Such materials and such tubes are, of course, well-known in the art. The structure described to this point in the detailed description is well-known in the art.

When it becomes necessary to remove the bushing insert from the well, the snuffer tube 50 is unscrewed from the plug mouth and detached. The threaded area 45 of the open mouth of shell 34 is exposed to allow removal of the insert by the use of the tool to be described next.

The extraction tool 60 is comprised of two telescoping members, the collet member 61 and the expander bolt or stud member 62. The collet member 61, shown in FIGS. 4, 5, 6 and 7, comprises a metallic tube of material such as brass with a headed end a slightly smaller diameter barrel or body section. The headed end section 64 is formed with an external hex shape and within the headed section 64 of the collet member, the through-bore 66 is suitably threaded. The body end or barrel 68 of the collet member is externally threaded to mate within the threaded mouth 44 of the bushing plug when inserted in place of the snuffer tube 50. The body end 68 is slitted with four equally spaced, diametral slots 70 which extend axially through the barrel of the collet member, with the slits extending for a distance incised into the barrel of the collet member tube.

The bore 66 of the collet member extends from the threaded bore diameter within the headed end section to a tapered section 80 within the barrel, the taper being in the nature of decreasing diameter of the bore as it approached the remote end of the barrel or body.

Thus, the collet member has a head section adapted to be gripped with a wrench, a threaded, slitted comparatively resilient barrel and an internal bore, threaded in the head area and tapered within the barrel end.

The expander bolt 62 of FIG. 8, has at one end a hex head 90 to allow the bolt to be grasped by a wrench. Below the head 90, the bolt body 92 is threaded with a thread sized to mate in threaded engagement with the collet bore thread 66. The bolt body 92 below the threaded section has a cylindrical section 94 which leads into a tapered or frusto conic section 99 at the distal end.

The bolt 62 may be made of material such as steel or other material harder than the collet member material. With the bolt being the harder of the two, galling or locking of the bolt within the collet is minimized. The frusto-conic section 96 of the expander bolt may be tapered at an included angle of about 12° relative to the axis of the bolt. This angle is roughly equal to the collet bore angle.

The angle noted has been determined as a result of the coefficient of friction of two materials being joined in the collet and bolt to produce the necessary mechanical advantage for relatively easy spreading or expanding of the collet body. The angle is determined so that the engaging parts will not join together and will not of themselves release. Thus, the taper angle is slightly greater than the angle of repose of the bolt in the collet member. The angle is determined on the basis of the coefficient of static friction of the members due to their respective materials and the amount of normal force necessary to generate the spreading force on the collet member using the relationship that the tangent of the included angle should equal the coefficient of friction between the mating members.

In use, with the expander bolt threaded loosely in the collet member, the collet member is threaded by hand into the bushing insert threaded mouth in place of the arc snuffer. The bolt 62 is then threaded down until snug by hand. Then, holding the collet member from rotating with a wrench, the expander bolt is tightened to what has been found to be adequate torque, approximately 25 ft. lbs. This action expands the threaded barrel on the collet member within the bushing insert. Then, by counterclockwise rotation with a wrench on the collet member alone, the bushing insert and tool may be released and detached from the well as a unit. For installation of the insert plug, clockwise rotation of the collet member is used.

To remove the tool from the bushing insert, the collet member is held against rotation with a wrench, and the expander bolt is backed out of the collet member with a wrench. The threaded barrel of the collet member is allowed to spring back, and thereafter the collet member may be backed off and released from the bushing insert by hand.

Thus, I have shown a relatively simple tool which is compact for fitting into a bushing insert and which has an exterior shape adapted to receive suitable wrenches or the like to effect the tightening and loosening action.

I claim:

1. A tool adapted to remove a load break bushing insert from a bushing well wherein the bushing insert has a tubular outer elastomeric housing surrounding a tubular conductive member with one end of said tubular conductive member threadedly engaged to a connection in said bushing well, and the other end of said member having an internally threaded mouth section, and said bushing well body being of tubular shape and having an interference fit about said elastomeric housing, the invention comprising: a collet member having a head portion adapted to be gripped with a wrench, and an externally threaded barrel, said barrel adapted to mate with the internally threaded mouth section, and means for expanding said barrel into mating thread-to-thread engagement with said mouth section whereby said collet member and said bushing insert may be rotatably retracted and detached as a unit from said bushing well without damaging the threads of said insert.

2. A tool as claimed in claim 1, wherein said expanding means comprises a stud member cooperative with an axial bore in said collet member, and said stud member includes a threaded male portion adapted to be received in a female threaded portion of the bore of said collet member.

3. A tool as claimed in claim 2, wherein the threaded male portion of said stud member leads to a tapered end section of said stud member for causing expansion of the barrel of said collet member.

4. A tool as claimed in claim 2, wherein the bore of said collet member is tapered adjacent one end thereof to receive said stud member to cooperately expand said collet member barrel.

5. A tool as claimed in claim 3, wherein the bore of said collet member is tapered inwardly to receive the tapered section of said stud member cooperatively spreading said collet member barrel.

6. A tool as claimed in claim 3, wherein said barrel is slotted axially to increase the expandability thereof.

7. A method of detaching a load break bushing insert from a bushing well wherein the bushing insert has a tubular outer elastomeric housing surrounding a tubular conductive shell with one end of said tubular conductive shell threadedly connected to a connection in said bushing well, and the other end of said shell having an internally threaded mouth section, and said bushing well body being of tubular shape and having an interference fit about said elastomeric housing, the invention comprising the steps of screwing a tubular member having an externally threaded barrel portion into the threaded mouth section, expanding the threaded barrel portion within the threaded mouth to resist loosening or tightening torque applied to the tubular member, rotating the tubular member in a reverse direction to threadedly withdraw the bushing insert and collet tubular member as a unit, from the threaded mouth section without damaging threads of the threaded mouth, and thereafter releasing the expansion forces on the tubular member to release the insert from the tubular member.

8. A tool for separating a tubular object held threadedly at a remote end thereof, wherein the tubular object has an internally threaded bore adjacent the free end thereof, the tool comprising an expandable tubular member including a head end and a body end, said expandable member having a threaded bore therethrough capable of receiving an expander member, the expandable member body end threaded externally for mating with the threaded bore of said inner tubular object, the body end of said expandable member being slotted to render said body end flexible; said expander member comprising means received in the bore of said expandable member for joining said expander and expandable members together in a detachable manner, said expander member including a portion for expanding the body end into locking engagement with the threaded bore of said inner tubular object, said head end including a gripping area to allow rotatable retraction of said object from said outer member without release of said expandable member from said object, and said expander means adapted to permit detachment of said members and said object from one another.

9. A tool as claimed in claim 8 wherein said expander member comprises a stud with a headed end portion joining said expander member to said expandable member and said stud includes a tapered toe portion acting on said flexible body end to expand the body of said expandable member, and wherein the bore of said expandable member is tapered at the inserted end to expand on receipt of the expander member therein.

* * * * *